(12) United States Patent
Takayama

(10) Patent No.: US 6,510,278 B1
(45) Date of Patent: Jan. 21, 2003

(54) DIGITAL REPRODUCING APPARATUS AND CONTROL METHOD

(75) Inventor: Nobutoshi Takayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/872,439

(22) Filed: Jun. 10, 1997

(30) Foreign Application Priority Data

Jun. 11, 1996 (JP) ............................................. 8-170736
May 29, 1997 (JP) ............................................. 9-154307

(51) Int. Cl.$^7$ ................................................ H04N 5/93
(52) U.S. Cl. ............................ 386/52; 386/55; 386/69; 358/906
(58) Field of Search ............................. 386/4, 38, 52, 386/55, 65, 69, 117, 129, 81, 124; 358/906; H04N 5/93

(56) References Cited

U.S. PATENT DOCUMENTS

| | | | | |
|---|---|---|---|---|
| 4,837,680 A | * | 6/1989 | Crockett et al. | ............ 364/200 |
| 5,526,125 A | * | 6/1996 | Mori et al. | .................. 358/311 |
| 5,686,967 A | * | 11/1997 | Maegawa | ................... 348/512 |
| 5,689,244 A | * | 11/1997 | Iijima et al. | ........... 340/825.07 |
| 5,742,730 A | * | 4/1998 | Couts et al. | ................... 386/69 |
| 5,907,661 A | * | 5/1999 | Kashida et al. | ............. 386/124 |

* cited by examiner

*Primary Examiner*—Vincent Boccio
(74) *Attorney, Agent, or Firm*—Morgan & Finnegan, LLP

(57) ABSTRACT

In an editing system with an editing apparatus and a recording apparatus in mutually distant locations, a reproducing apparatus is at first connected with the editing apparatus. The reproducing apparatus outputs the reproduced image signal and the positional information, indicating the position of the image signal on the recording medium, to the editing apparatus. The editing apparatus generates program information, for controlling the reproducing operation of the reproducing apparatus, utilizing the image signal and the positional information, and outputs the program information to the reproducing apparatus. Then the reproducing apparatus is connected with the recording apparatus. Based on the program information outputted by the editing apparatus, the reproducing apparatus controls the reproducing operation of the reproducing apparatus itself and also controls the recording operation of the recording apparatus. Thus a highly complex editing operation can be achieved in a simple manner, without moving the recording apparatus and the editing apparatus even if they are positioned in distant locations.

24 Claims, 7 Drawing Sheets

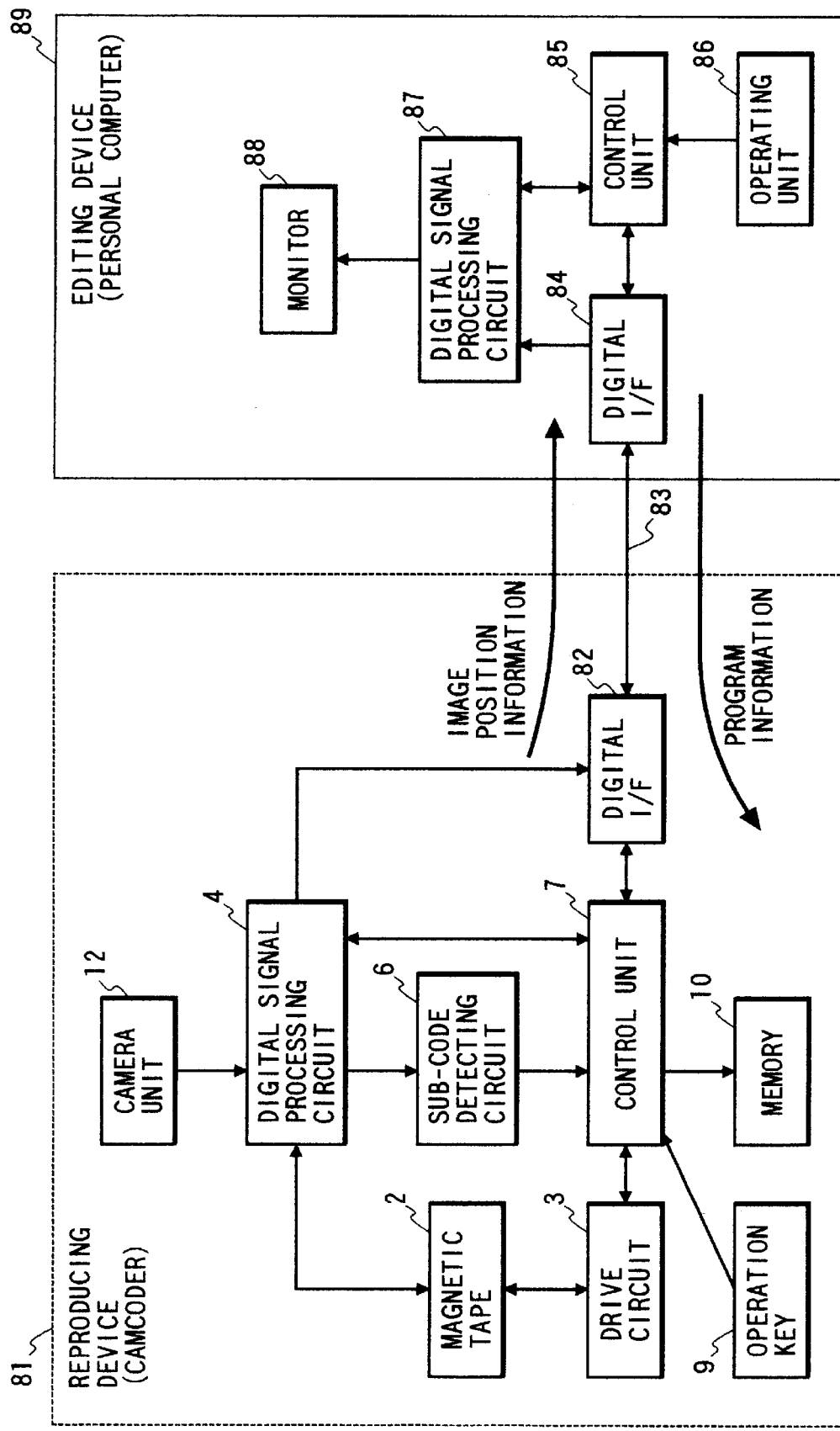

DIGITAL REPRODUCING APPARATUS AND CONTROL METHOD

BACKGROUND OF THE INVENTION

1. Field of the Invention

The present invention relates to an editing system, and more particularly to such system adapted for editing/dubbing image and audio information, recorded on a recording medium such as a magnetic tape, to another recording apparatus.

2. Related Background Art

In editing/dubbing image and audio information, recorded on a recording medium, from a reproducing apparatus to another recording apparatus, such operation has conventionally been conducted by connecting the reproducing apparatus and the recording apparatus to another editing apparatus.

In the conventional editing system, the editing apparatus selects desired scenes from the image information reproduced by the reproducing apparatus and dubbing/editing each scene to the recording apparatus according to instruction of the user. In such editing apparatus, an editing program is prepared utilizing information on the plural scenes desired by the user, for example positional information, such as a time code, indicating the position of the image information recorded on the recording medium, and the editing apparatus itself executes the dubbing/editing operation based on such editing program.

For facilitating the usually highly complex editing operation, a personal computer is ordinarily employed as the editing apparatus. In fact there are already available a number of application programs which utilize the personal computer as the editing apparatus. In such editing system, the editing program can be easily prepared by fetching the image information of a scene to be edited (for example that of the start point) into the personal computer in relation to the positional information (for example the time codes of the start point and the end point), and rearranging the image information, displayed on the monitor, by drag and drop operations.

In such editing system utilizing the personal computer, the reproducing apparatus and the recording apparatus have to be positioned close to the personal computer as they have to be connected to the personal computer for executing the dubbing/editing operation. Therefore, in case the recording apparatus and the personal computer are positioned mutually distance, for example in different rooms, the dubbing/editing program by the personal computer is difficult to prepare.

SUMMARY OF THE INVENTION

An object of the present invention is to solve the above-described drawbacks.

Another object of the present invention is to enable, in an editing system, a highly complex editing operation without moving the recording apparatus and the editing apparatus even if they are provided in distance locations.

BRIEF DESCRIPTION OF THE DRAWINGS

FIG. 8 is a block diagram showing the configuration at the preparation of the editing program by the reproducing apparatus in a second embodiment of the present invention;

DESCRIPTION OF THE PREFERRED EMBODIMENTS

The preferred embodiments of the present invention will be described in detail hereinafter with reference to the accompanying drawings.

[First Embodiment]

Figure 1:
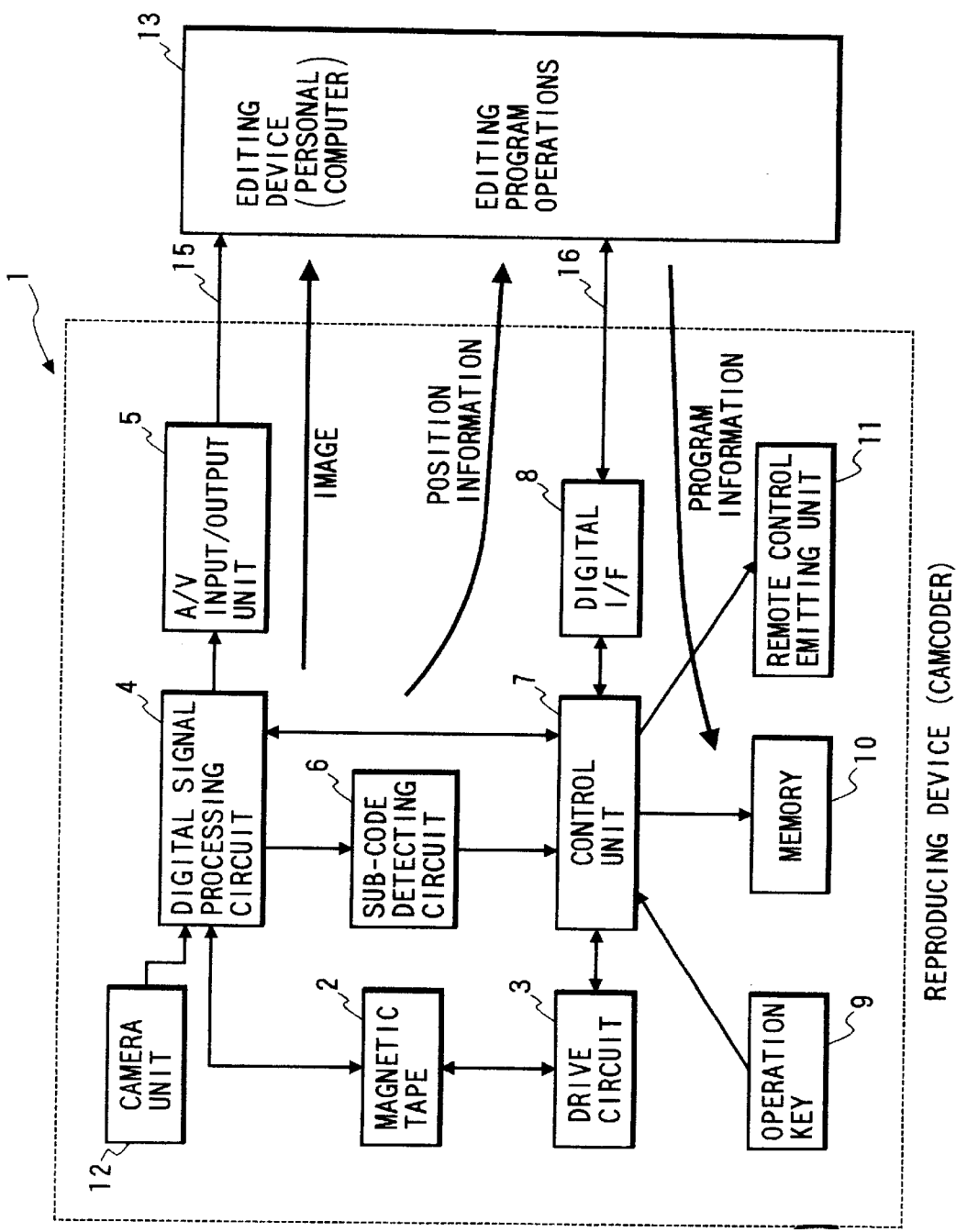
FIG. 1 is a block diagram showing the configuration at the preparation of an editing program by the reproducing apparatus in a first embodiment of the present invention.
Figure 4:
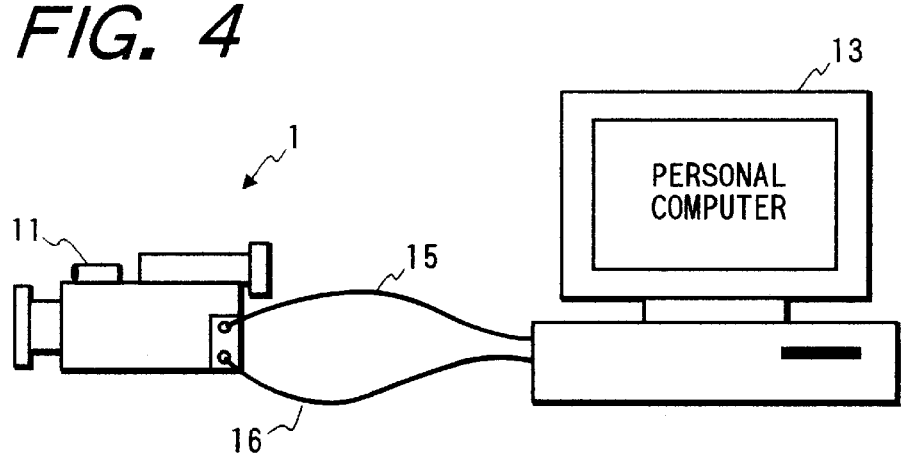
FIG. 4 is a block diagram showing the configuration of an editing system at the preparation of the editing program by the reproducing apparatus in the first embodiment of the present invention.
Figure 5:
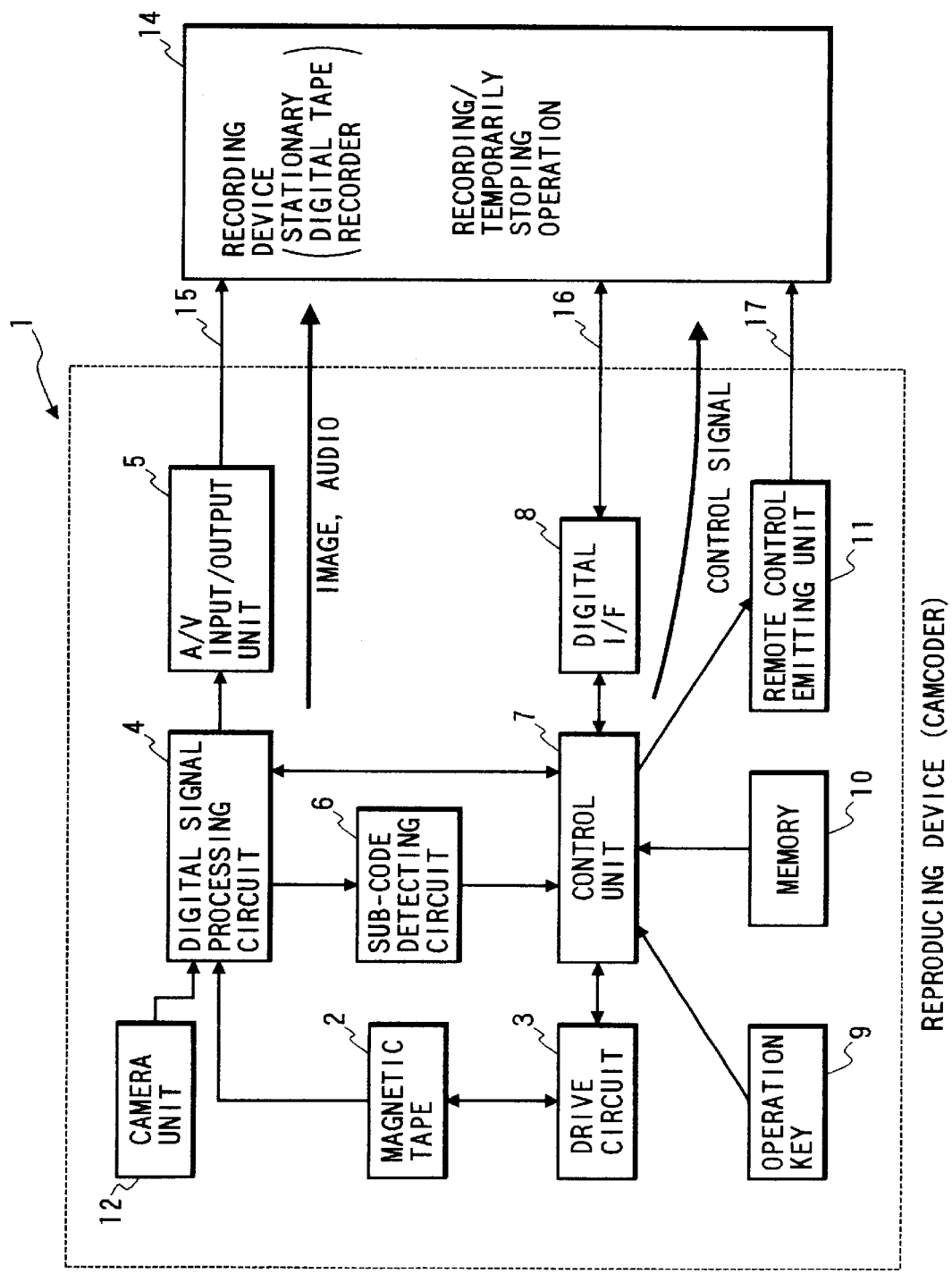
FIG. 5 is a block diagram showing the configuration at the execution of the editing operation by the reproducing apparatus in the first embodiment of the present invention.

At first there will be explained, as a first embodiment of the present invention, a configuration in which the present invention is applied to an editing system employing a camera-recorder integrated digital video cassette recorder (hereinafter called camcorder) with reference to FIGS. 1 to 7, wherein FIG. 1 is a block diagram showing the configuration at the preparation of an editing program in the editing system constituting a first embodiment of the present invention, while FIG. 5 is a block diagram showing the configuration for executing the dubbing/editing operation from the camcorder to the recording apparatus.

In these drawings, a camcorder 1 is provided with a magnetic tape 2, a driving circuit 3, a digital signal processing circuit 4, an audio/video (A/v) input/output unit 5, a sub-code detecting circuit 6, a control unit 8 including a microcomputer 7, a digital interface (I/F) 8, an operation key unit 9, a memory 10, a remote control light emission unit 11 and a camera unit 12.

The magnetic tape 2 constitutes the recording medium for recording the image and audio signals taken by the camera unit 12. The driving circuit 3 controls the driving of the magnetic tape 2 according to instructions from the control unit 7. The configuration of the digital signal processing circuit 4 will be explained with reference to FIG. 2.

Figure 2:
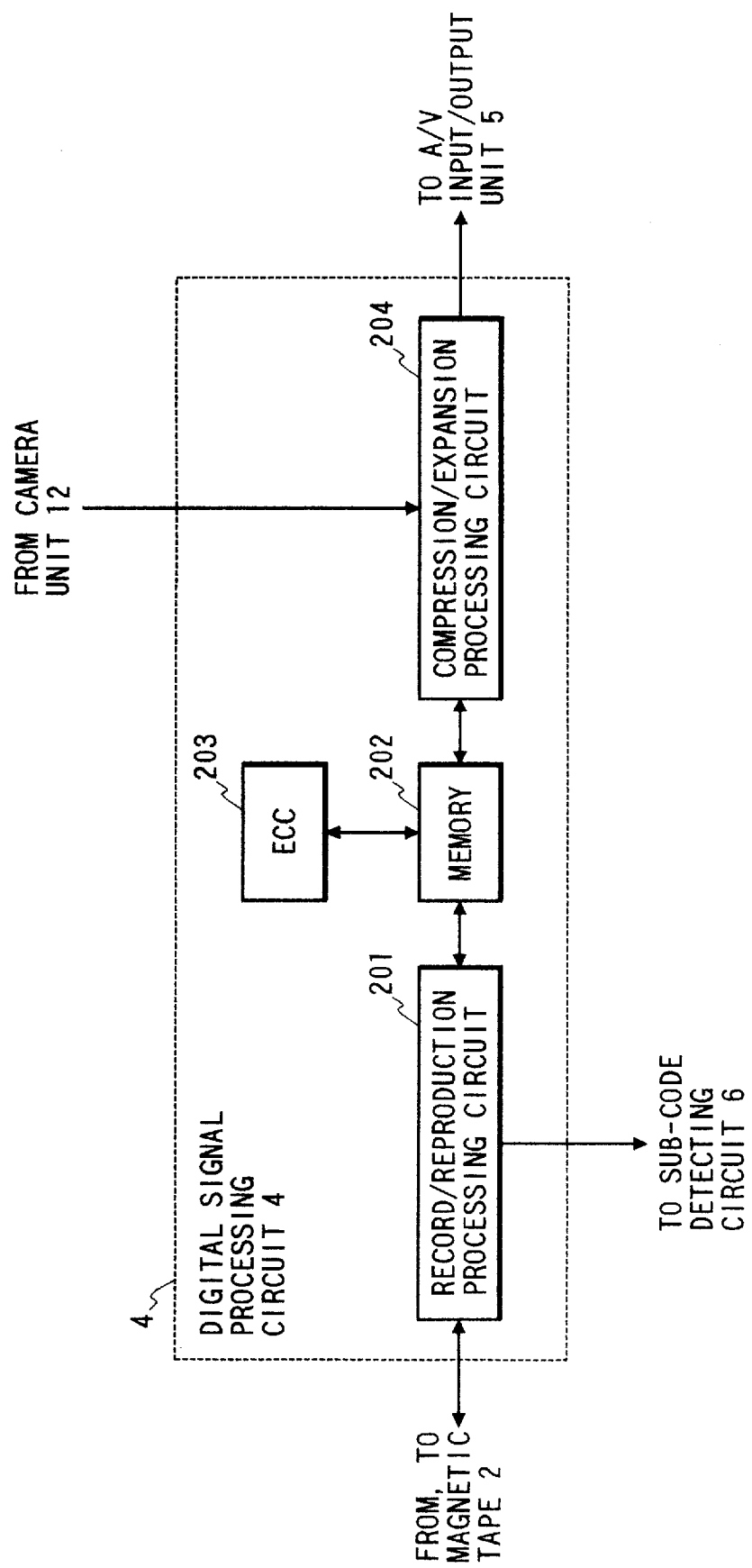
FIG. 2 is a block diagram showing the configuration of a digital signal processing circuit 4.

Referring to FIG. 2, a record/reproduction processing circuit 201 executes reproduction of the digital signal (image signal, audio signal and auxiliary information) recorded in a predetermined area of the magnetic tape 2 and recording of the digital signal (image signal and audio signal) released from the camera unit 12. A memory 202 temporarily stores the output signal from the record/reproduction processing circuit 201 and a compression/expansion processing circuit 204. An error correction circuit (ECC) 203 adds parity data to the digital signal for recording at the recording operation and corrects the error in the reproduction signal by means of such parity data at the reproducing operation, by making access to the memory 202. The compression/expansion processing circuit 204 executes a known highly efficient compression encoding (for example variable length encoding after an orthogonal transformation) on the image and audio signal taken by the camera unit 12, and executes an expansion process on the compressed signal reproduced by the record/reproduction processing circuit 201.

The A/V input/output unit 5 is an interface for executing analog conversion on the digital image signal released from the digital signal processing circuit 4, for supply to an external equipment. The sub-code detection circuit 6 detects the auxiliary information (for example positional information such as a time code, or ID information specifying the image information recording on the magnetic medium) recorded on the magnetic tape 2. The control unit 7 is provided with a microcomputer and controls the functions of the entire camcorder 1. The digital I/F 8 is a digital interface capable of bidirectional communication of the information signal from the control unit 7 and that from the external equipment. The operation key unit 9 is provided with switches for recording, reproduction, pause, fast winding, fast rewinding etc., in addition to a mode switch to be explained later, and supplies the control unit 7 with control signals corresponding to the actuation of these switches. The memory 10 serves to store an editing program prepared by an external editing apparatus and is composed for example of a RAM (random access memory). The remote control light emission unit 11 emits infrared light for remote controlling the function of the recording apparatus according to the editing program.

In the editing system of the present embodiment, the editing operation is conducted by connecting the above-described camcorder 1 (reproducing apparatus) with the editing apparatus (personal computer 13) shown in FIG. 1 and with a recording apparatus (fixed video cassette recorder 14) shown in FIG. 5. The personal computer 13 prepares an editing program, and the fixed VCR 14 records the information edited according to the editing program.

Referring to FIGS. 1 and 5, a video signal cable 15 is used for transmitting an analog image signal to the personal computer 13 or to the fixed VCR 14. In FIG. 1, a digital I/F cable 16 for transmitting the aforementioned positional information to the personal computer 13 is composed, in the present embodiment, of a cable according to the standard RS232C. In FIG. 5, a control signal 17 is released from the remote control light emission unit 11 for remote control of the fixed VCR 14.

Figure 3:
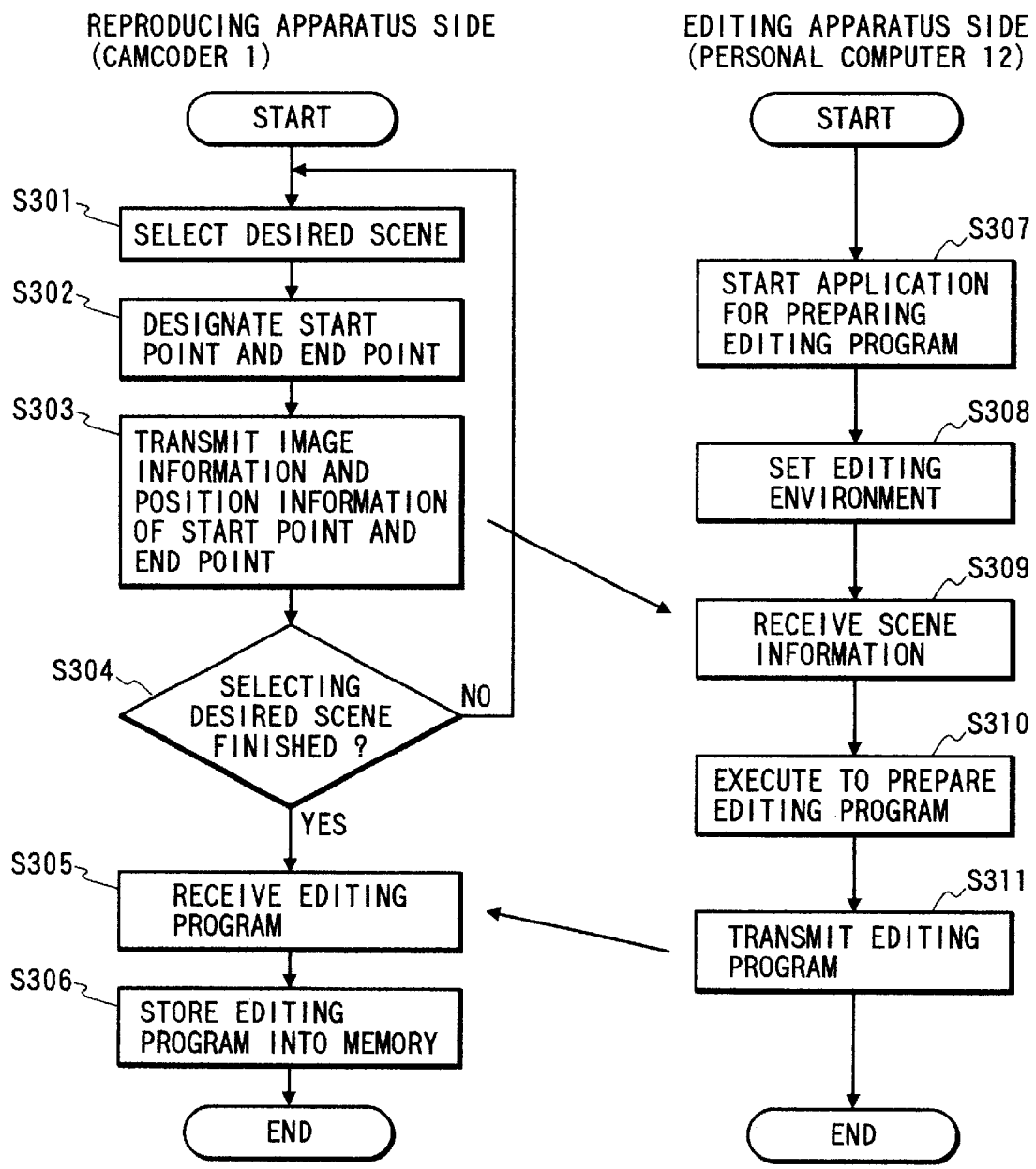
FIG. 3 is a flow chart showing the function in an editing program preparation mode.
Figure 6:
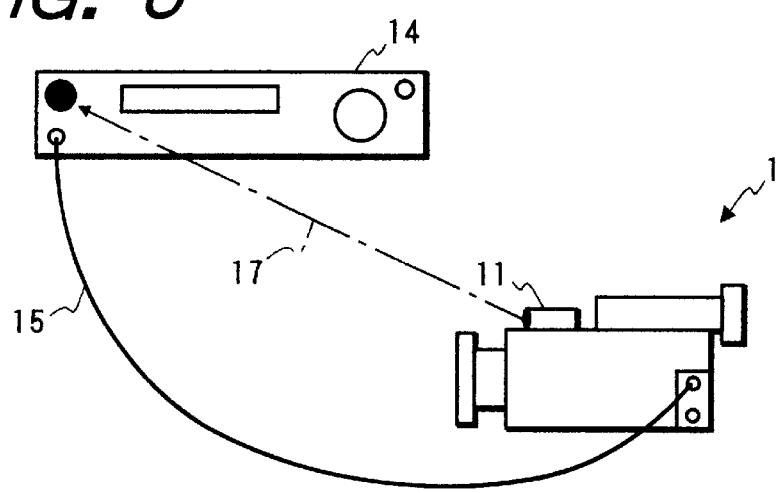
FIG. 6 is a view showing the configuration of an editing system at the execution of the editing operation by the reproducing apparatus in the first embodiment of the present invention.

In the following there will be explained the function of the editing system constituting the first embodiment of the present invention, with reference to FIGS. 1 to 6, wherein FIG. 3 is a flow chart showing the function of the editing system at the editing program preparation mode, FIG. 4 is a view showing an editing system constructed at the preparation of the editing program by the reproducing apparatus (camcorder 1), and FIG. 6 is a view showing an editing system constructed at the execution of the editing operation by the reproducing apparatus (camcorder 1) according to the editing program.

At first the user constructs an editing system as shown in FIG. 4, and then prepares an editing program by manipulating the camcorder 1 and the personal computer 13 (editing apparatus).

In the following there will be given a specific explanation on the method of preparing the editing program in the present embodiment.

At first the user connects the camcorder 1 with the personal computer 13 and executes initialization of these apparatus (steps S307, S308). For example, in the camcorder 1, the mode switch of the operation key unit 9 is so actuated that the operation mode becomes the "editing program preparation mode". In the present embodiment, the "editing program preparation mode" defines an operation of causing the personal computer 13 to prepare an editing program for instructing the actual editing operation based on the scene information designated by the camcorder 1 and, after such program preparation, causing such editing program to be stored in an editing program memory provided in the camcorder 1.

The user reproduces the image recorded on the magnetic tape 2, for selecting desired plural scenes from the image information taken by the camcorder 1 and recorded on the magnetic tape 2. If a desired scene is found in the course of reproduction, the operation key unit 9 is actuated at the start of such scene (step S301), thereby designating the start point (step S302). At the designation of such start point, the control unit 7 shifts the reproducing operation of the camcorder 1 to a still mode, and controls the signal processing circuit 4 in such a manner as to reproduce the image (1 frame) of the start point as a continuous signal. The signal thus reproduced is released from the A/V input/output circuit 5 to the personal computer 12 through the video signal cable 15 (step S303). The personal computer 13 stores the image information, entered through the video signal cable 15, in a recording medium (for example a hard disk) of the personal computer 13 (step S309).

On the other hand, the sub-code detection circuit 6 detects information relating to the image at the designation of the start point of the desired scene by the operation key unit 9, namely the auxiliary information including the positional information, such as the time code, recorded on the magnetic tape 2. The control unit 7 releases such auxiliary information from the digital I/F 8 to the personal computer 13 through the digital I/F cable 16 (step S303). The personal computer 13 stores the auxiliary information, entered through the digital I/F cable 16, in the recording medium, in relation to the image information corresponding to the auxiliary information (step S309).

Then the user actuates the operation key unit 9 of the camcorder 1 to designate the end point of the desired scene (step S302). The control unit 7 releases the image information at the end point and the corresponding positional information (for example time code) to the personal computer 13, in a similar manner as the aforementioned process at the start point. In this manner the user can enter the information of the desired scene into the personal computer 13 (step S309).

Through the repetition of the editing operation explained above (step S304), the personal computer 13 can fetch the information on the plural scenes desired by the user. Then the personal computer 13 displays, in easily understandable manner on the monitor, the information on the scenes received from the camcorder 1 (namely the image information at the start point and the end point of each scene and the corresponding auxiliary information such as time code) for example with icons, through the use of a predetermined application program. The user, while observing the information of the scenes displayed on the monitor, arbitrarily selects plural scenes and rearranges these scenes in a desired order. For further facilitating the editing operation, the rearrangement of the scenes may be achieved by drag and drop operations with a mouse. Simultaneously with the rearrangement of the scenes to be edited, the user can also designate the reproducing operation for each scene (for example normal reproduction, double-speed reproduction, slow reproduction, fast forwarding, rewinding or special reproduction). With such control, the personal computer 13 can generate an editing program based on the time codes of the scenes rearranged in the arbitrary order (step S310).

After the preparation of the editing program, the personal computer 13 transmits such editing program to the camcorder 1 through the digital I/F cable 16 (step S311). The camcorder 1 stores the received editing program in the editing program memory 10 through the digital I/F 9 (steps S305, S306).

The above-explained operations allow to easily prepare the editing program, capable of highly complex editing operation, in the reproducing apparatus (camcorder 1). In the present embodiment, each scene desired by the user is designated by the reproducing apparatus (camcorder 1), but the system may also be so constructed that the editing apparatus controls the function of the reproducing apparatus and the image signal reproduced in the reproducing apparatus is displayed on the monitor of the editing apparatus, whereby the desired scene can be selected in the editing apparatus.

Then, after constructing the editing system as shown in FIG. 6, the user operates the camcorder 1 and the recording apparatus (fixed VCR 14) to execute the editing operation (dubbing/editing) based on the editing program.

In the following there will be explained the specific editing operation in the present embodiment.

At first the user connects the camcorder 1 with the fixed VCR 14 and actuates the mode switch of the operation key unit 9 in such a manner that the camcorder 1 assumes the "editing operation mode". In the present embodiment, the "editing operation mode" means an operation that the camcorder 1 controls the recording apparatus to automatically execute the dubbing/editing on the image and audio information recorded on the recording medium of the camcorder 1, according to the above-mentioned editing program stored in the camcorder 1.

When the "editing operation mode" is set by the user, the camcorder 1 transmits a control signal from the remote control light emission unit 11, thereby initializing the fixed VCR 14. Thus the fixed VCR 14 executes control in such a manner as to move the magnetic tape to a recordable position (for example a position where no signal is recorded) according to the information recorded on a mounted magnetic tape for recording, and to assume a "record pause" mode. Also the fixed VCR 14 executes control in such a manner as to assume an "external input mode" for receiving and recording the output signal of the camcorder 1 through the A/V cable 15. In the above-described editing system, the remote control light emission unit 11 of the camcorder 1, constituting the reproducing apparatus, is so positioned as to transmit the control signal to a remote control light reception unit of the fixed VCR 13 constituting the recording apparatus.

After the initialization of the recording apparatus (fixed VCR 14), the camcorder 1 executes the reproducing operation of the scenes in succession, based on the editing program stored in the memory 10.

At first the camcorder 1 transports the magnetic tape 2 to the start point of a first scene, indicated by the positional information (time code etc.) in the editing program, and stops the magnetic tape once at the starting point. Then the camcorder 1 starts the reproducing operation designated by the editing program, and transmits a control signal from the remote control light emission unit 11, thereby instructing the fixed VCR 14 to start the recording of the first scene. After the reproduction of the first scene to the end point thereof, the camcorder 1 transmits a control signal to temporarily terminate the recording operation of the fixed VCR 14, and terminates the reproducing operation of the camcorder 1 itself. The above-described operation is similarly conducted also for the second and subsequent scenes.

Figure 7:
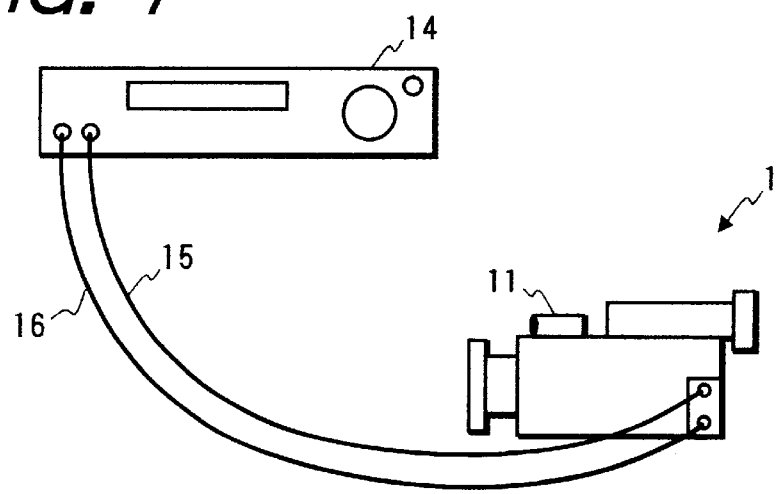
FIG. 7 is a view showing the configuration of an editing system at the execution of the editing operation by the reproducing apparatus in another embodiment of the present invention.

The above-described dubbing/editing operation for all the scenes designated by the editing program enables simple and automatic dubbing/editing of the desired image and audio information, recorded on the magnetic tape 2, by the recording apparatus (fixed VCR 14). In the present embodiment, the control signal for controlling the function of the recording apparatus is transmitted through the remote control light emission unit, but such control signal may also be transmitted through the digital I/F 8. In such case, the camcorder 1 and the fixed VCR 14 have to be connected with the digital I/F cable 15 as shown in FIG. 7.

As explained in the foregoing, the present embodiment enables highly complex editing operation without having to move the editing apparatus (personal computer 13) and the recording apparatus (fixed VCR 14) even when they are positioned in distant locations, for example in different rooms. Also the use of the personal computer 13 as the editing apparatus enables preparation of an editing program effectively utilizing the various reproducing functions (normal reproduction, varied-speed reproduction, special reproduction etc.) and the various special functions (digital effects such as wiping, overlapping etc.) of the reproducing apparatus. Also even a complex editing operation can be achieved in simple manner by the automatic editing operation of the reproducing apparatus (camcorder 1) itself according to such editing program.

[Second Embodiment]

Figure 9:
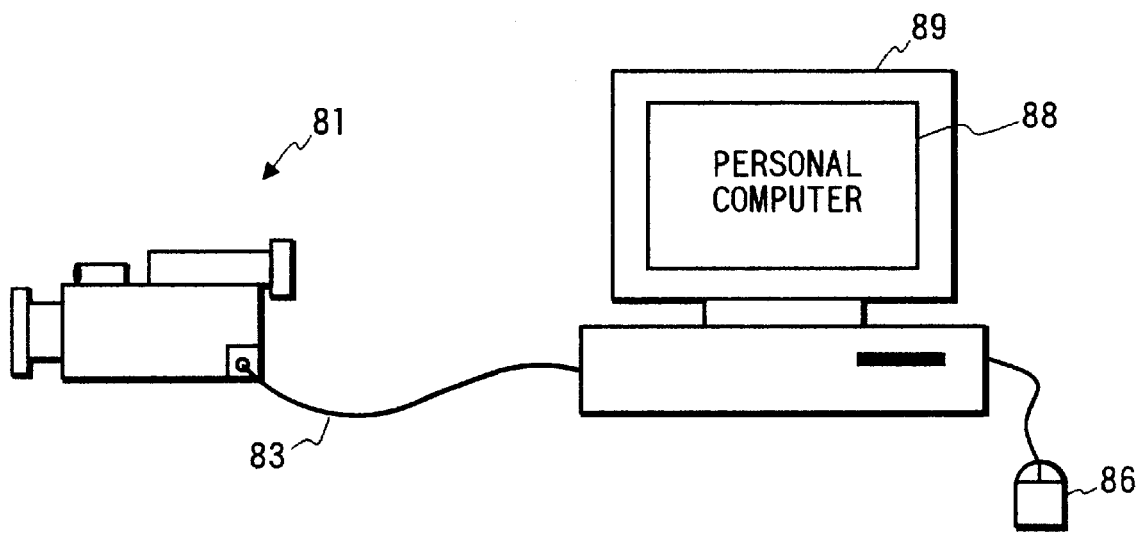
FIG. 9 is a view showing the configuration of an editing system at the preparation of the editing program by the reproducing apparatus in the second embodiment of the present invention.
Figure 10:
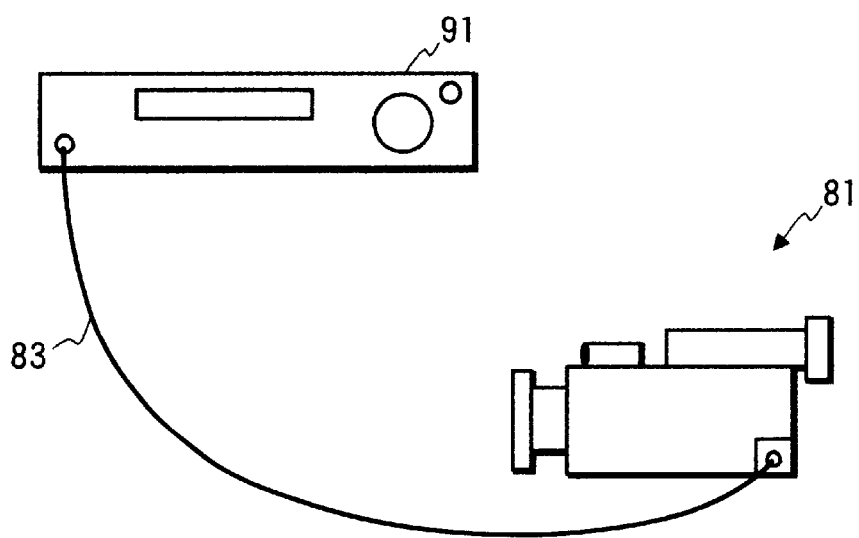
FIG. 10 is a view showing the configuration of an editing system at the execution of the editing operation by the reproducing apparatus in the second embodiment of the present invention.

In the following there will be explained a second embodiment of the present invention, with reference to FIGS. 8 to 10, wherein FIG. 8 is a block diagram showing the configuration at the preparation of the editing program by a reproducing apparatus constituting the second embodiment of the present invention, while FIG. 9 is a view showing an editing system to be constructed at the preparation of the editing program by the reproducing apparatus of the second embodiment, and FIG. 10 is a view showing an editing system to be constructed at the execution of the editing operation by the reproducing apparatus of the second embodiment. In the present embodiment, components similar or equivalent in function to those in the first embodiment will be represented by the corresponding numbers and will not be explained in detail.

In the first embodiment, the image and audio signals are transmitted by the A/V input/output circuit 5 while the positional information such as time code and the editing program are transmitted by the digital I/F 8 and the control signal for controlling the recording apparatus is transmitted by the remote control light emission unit 11, but these transmission means may also be realized by a single digital interface. In such case there is employed a digital interface capable of bidirectional communication of various digital signal (image signal, editing program, control signal etc. in the present embodiment), based for example on RS232C or IEEE1394.

The second embodiment discloses a configuration in which the digital I/F 82 of the camcorder 81 is composed of a digital interface based on IEEE1394-1995. Referring to FIG. 8, there are shown a digital I/F cable 83 based on IEEE1394-1995 such as a DV cable, a 1394 digital interface 84 of a personal computer 89, a control unit 85 including a microcomputer, for controlling the personal computer 89, an operation unit 86 for entering various instructions for example at the preparation of the editing program, a digital signal processing circuit 87 for processing the information, entered through the digital I/F 84, into a signal form suitable for display, and a monitor 88 for displaying various information.

In the following there will be explained a specific method of preparation of the editing program in the present embodiment.

At first the user constructs an editing system as shown in FIG. 9. In the present embodiment, since the necessary signals are communicated through the digital interfaces 82, 84, the reproducing apparatus (camcorder 81) and the editing apparatus (personal computer 89) can be connected with only one digital I/F cable 83.

At first the user connects the camcorder 81 with the personal computer 89, and manipulates the operation key unit 9 and the operation unit 86 in such a manner that these apparatus assume the "editing program preparation mode". In the present embodiment, the "editing program preparation mode" means an operation of preparing the editing program, instructing the editing operation to be actually executed by the camcorder 81, by the personal computer 89 and storing thus prepared editing program in the editing program memory of the camcorder 81.

The user activates a predetermined application program in the personal computer 89, thereby controlling the reproducing operation of the camcorder 81. The digital signal processing circuit 4 of the camcorder 81 reproduces the compressed information signal (moving image information and audio information), recorded on the magnetic tape 2, and the related auxiliary information (including positional information such as time code, or information specifying the image such as ID), by a record/reproduction processing circuit 201. The reproduced compressed information signal is entered, through a memory 202, into the digital I/F 82, while the auxiliary information is entered, through the sub-code detection circuit 6, into the digital I/F 82. The digital I/F 82 converts the reproduced moving image information, the audio information and the auxiliary information into packets of a predetermined data unit, and transmits such packets by synchronous transmission in every predetermined communication cycle (for example of 125 μs), for example by isochronous transmission defined under IEEE1394.

The personal computer 89 receives the information signal (moving image information and audio information), transmitted from the camcorder 81, by a digital I/F 74 and displays such signal on the monitor 88. The digital signal processing circuit 87 is provided with a memory and is adapted to expand the image and audio information, received through the digital I/F 84, for supply to the monitor 88, thus being similar in function to the digital signal processing circuit 4. The user selects a desired scene from the displayed image and designates the start point and the end point of such scene by the operation unit 86. At the designation of the start point, the control unit 85 transmits, through the digital I/F, a control signal to shift the reproducing operation of the camcorder 81 to the "still mode". In the present embodiment, the control signal is transmitted between the camcorder 81 and the personal computer 89 in asynchronous manner (for example by asynchronous transfer defined in IEEE1394). According to the control of the personal computer 89, the camcorder 81 reproduces the image (1 frame) at the start point and the positional information, and transmits these, in mutual correlation, to the personal computer 89.

Then the user designates the end point of the desired scene, by actuating the operation unit 86 of the personal computer 89. The control unit 7 of the camcorder 81 transmits the image information at the end point and the corresponding positional information (for example time code) to the personal computer 89, in a similar as the process at the start point. In this manner the user can enter the information of the desired scene into the personal computer 89.

Through the repetition of the editing operation explained above, the personal computer 89 can fetch the information on the plural scenes desired by the user. Then the personal computer 89 displays, in easily understandable manner on the monitor, the information on the scenes received from the reproducing apparatus (namely the image information at the start point and the end point of each scene and the corresponding auxiliary information such as time code) for example with icons. The user, while observing the information of the scenes displayed on the monitor, arbitrarily selects plural scenes and rearranges these scenes in a desired order. For further facilitating the editing operation, the rearrangement of the scenes may be achieved by drag and drop operations with a mouse. Simultaneously with the rearrangement of the scenes to be edited, the user can also designate the reproducing operation for each scene (for example normal reproduction, double-speed reproduction, slow reproduction, fast forwarding, rewinding or special reproduction). With such control, the personal computer 89 can generate an editing program based on the time codes of the scenes rearranged in the arbitrary order.

After the preparation of the editing program, the personal computer 89 effects asynchronous transfer (for example asynchronous transfer defined under IEEE1394) of such editing program through the digital I/F 74. The camcorder 81 stores the received editing program in the editing program memory 10 through the digital I/F 82.

Through the above-described operations, there can be easily prepared, in the reproducing apparatus (camcorder 81) an editing program for executing a highly complex editing operation.

Then the user constructs an editing system as shown in FIG. 9, by connecting the camcorder 81 and the recording apparatus (fixed VCR 91) with a digital I/F cable 83. The fixed VCR 91 is provided with a digital interface capable communicating with the digital I/F 84. The camcorder 81 controls the function of the fixed VCR 94 according to the editing program stored in the memory 10, thereby executing the editing operation (dubbing/editing) shown in the first embodiment.

In the second embodiment, all the communications between the camcorder 81 and the fixed VCR 91 are conducted through the digital I/F 84. Consequently, in the present embodiment, the moving image signal, the audio signal and the auxiliary information reproduced in the camcorder 81 are transferred by synchronous transfer in every predetermined communication cycle time (for example isochronous transfer defined under IEEE1394). Also the control signal transmitted by the camcorder 71 for controlling the function of the fixed VCR 91 is transferred in asynchronous manner (for example by asynchronous transfer defined under IEEE1394).

As explained in the foregoing, the present embodiment enables highly complex editing operation without having to move the editing apparatus (personal computer 89) and the recording apparatus (fixed VCR 91) even when they are positioned in distant locations, for example in different rooms. Also the use of the personal computer 89 as the editing apparatus enables preparation of an editing program effectively utilizing the various reproducing functions (normal reproduction, varied-speed reproduction, special reproduction etc.) and the various special functions (digital effects such as wiping, overlapping etc.) of the reproducing apparatus. Also even a complex editing operation can be achieved in simple manner by the automatic editing operation of the reproducing apparatus (camcorder 81) itself according to such editing program. Furthermore, the connection between the different equipment can be made simpler and easily understandable, by providing each equipment with a digital interface capable of bidirectional communication of the moving image signal and the control signal with a single cable.

The invention may be embodied in other specific forms without departing from the spirit or essential characteristics thereof.

For example the camcorder employed in the reproducing apparatus in the present embodiment may also be replaced by a reproducing apparatus without the image taking unit. Also the recording medium is not limited to the magnetic tape but can also be composed, for example, of a magnetic disk. Also the signal recording may be made in analog manner or in digital manner. Furthermore, the editing apparatus connected with the reproducing apparatus is not limited to the personal computer employed in the present embodiment, but may also be composed of a word processor or an exclusive editing apparatus. Furthermore, the recording apparatus is not limited to the fixed VCR but can be composed of any recording apparatus provided with recording means, for example a camcorder.

Furthermore, the reproducing apparatus of the present embodiment may be connected to a printer capable of outputting the image signal. In such case, the editing apparatus generates program information for designating the editing operation for the desired image, utilizing the image signal (for example of a still image) held in the reproducing apparatus and the positional information of such image signal, and transmits such program information to the reproducing apparatus. The user can achieve automatic editing and printing of the desired image based on such program information, by connecting the reproducing apparatus containing the program information to the printer.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. A reproducing apparatus, comprising:
   a digital interface;
   a memory; and
   a control unit connected to the digital interface and the memory,
   wherein the digital interface receives a control program from an external device connected to the digital interface,
   wherein the control unit receives the control program from the digital interface and stores the control program in the memory,
   wherein the control program includes program information for controlling a reproduction operation of the reproducing apparatus and a recording operation of a recording apparatus, and
   wherein the control unit controls the reproduction operation and the recording operation according to the control program after the external device is disconnected from the reproducing apparatus and the recording apparatus is connected to the reproducing apparatus.

2. The reproducing apparatus of claim 1, wherein the digital interface transmits auxiliary information including a start position of image information and an end position of image information to the external device.

3. The reproducing apparatus of claim 1, wherein the control program controls a reproduction order of image information.

4. The reproducing apparatus of claim 1, wherein the digital interface conforms to the IEEE 1394 standard.

5. The reproducing apparatus of claim 1, wherein the control information for controlling the recording operation of the recording apparatus to the recording apparatus via the digital interface.

6. The reproducing apparatus of claim 1, wherein the reproducing apparatus is a video recorder integrated with a camera.

7. A method for controlling a reproducing apparatus, comprising:
   receiving a control program from an external device connected to a digital interface;
   storing the control program in a memory; and
   controlling a reproduction operation of the reproducing apparatus and a recording operation of a recording apparatus according to the control program after the external device is disconnected from the reproducing apparatus and the recording apparatus is connected to the reproducing apparatus.

8. The method of claim 7, further comprising:
   transmitting auxiliary information to the external device, wherein auxiliary information includes a start position of image information and an end position of image information.

9. The method of claim 7, wherein the control program controls a reproduction order of image information.

10. The method of claim 7, wherein the digital interface conforms to the IEEE 1394 standard.

11. The method of claim 7, wherein the controlling of the recording operation of the recording apparatus includes transmitting control information to the recording apparatus via the digital interface.

12. The method of claim 7, wherein the reproducing apparatus is a video recorder integrated with a camera.

13. A reproducing apparatus, comprising:
   a digital interface;
   a memory; and
   a control unit connected to the digital interface and the memory,
   wherein the digital interface receives a control program from an external device connected to the digital interface,
   wherein the control unit receives the control program from the digital interface and stores the control program in the memory,
   wherein the control program includes program information for controlling a reproduction operation of the reproducing apparatus and a recording operation of a recording apparatus, and
   wherein the control unit controls the reproduction operation and the recording operation according to the control program after the control unit receives the control program and after communication between the control unit and the external device ceases.

14. The apparatus of claim 13, wherein the digital interface transmits auxiliary information including a start position of image information and an end position of image information to the external device.

15. The apparatus of claim 13, wherein the digital interface conforms to the IEEE 1394 standard.

16. The apparatus of claim 13, wherein the control program controls a reproduction order of image information.

17. The apparatus of claim 13, wherein the control unit transmits control information for controlling the recording operation of the recording apparatus to the recording apparatus via the digital interface.

18. The apparatus of claim 13, wherein the reproducing apparatus is a video recorder integrated with a camera.

19. A method for controlling a reproducing apparatus, comprising:

receiving a control program from an external device connected to a digital interface;

storing the control program in a memory; and controlling a reproduction operation of the reproducing apparatus and a recording operation of a recording apparatus according to the control program after the control unit receives the control program and after communication between the control unit and the external device ceases.

20. The method of claim 19, further comprising:

transmitting auxiliary information including a start position of image information and an end position of image information to the external device via the digital interface.

21. The method of claim 19, wherein the digital interface conforms to the IEEE 1394 standard.

22. The method of claim 19, wherein the control program controls a reproduction order of image information.

23. The method of claim 19, wherein the controlling of the recording operation of the recording apparatus includes transmitting control information to the recording apparatus via the digital interface.

24. The method of claim 19, wherein the reproducing apparatus is a video recorder integrated with a camera.

* * * * *

UNITED STATES PATENT AND TRADEMARK OFFICE
CERTIFICATE OF CORRECTION

PATENT NO.      : 6,510,278 B1
DATED           : January 21, 2003
INVENTOR(S)     : Nobutoshi Takayama It is certified that error appears in the above-identified patent and that said Letters Patent is hereby corrected as shown below:

<u>Title page,</u>
Item [56], References Cited, U.S. PATENT DOCUMENTS, please add
-- 5,907,656 * 5/1999 Oguro 386/94 --.

<u>Column 10,</u>
Line 18, please add -- unit transmits control -- after "control".

Signed and Sealed this

Fourth Day of November, 2003

JAMES E. ROGAN
*Director of the United States Patent and Trademark Office*